United States Patent [19]
Wilcox

[11] 3,915,808
[45] Oct. 28, 1975

[54] AUTOMATIC DISTILLING SYSTEM
[75] Inventor: Harold R. Wilcox, Maynard, Mass.
[73] Assignee: Riggs & Lombard, Inc., Lowell, Mass.
[22] Filed: Mar. 18, 1974
[21] Appl. No.: 452,216

[52] U.S. Cl................. 202/160; 68/18 R; 68/18 C; 202/172; 202/206; 202/174; 202/169; 203/2; 210/138; 159/17
[51] Int. Cl.²...................... B01D 3/42; B01D 3/02
[58] Field of Search........... 202/160, 172, 173, 206, 202/155, 156, DIG. 7, DIG. 18; 203/1, 2, 71; 159/17 P, 20; 68/18 R, 18 C; 210/138

[56] References Cited
UNITED STATES PATENTS

| | | | |
|---|---|---|---|
| 2,140,623 | 12/1938 | Hetzer | 202/181 |
| 2,181,731 | 11/1939 | Hinckley | 159/20 R |
| 2,262,519 | 11/1941 | Talton | 159/20 R |
| 3,366,551 | 1/1968 | Kaso | 210/138 X |
| 3,503,433 | 3/1970 | Riva et al. | 159/24 R |

Primary Examiner—Norman Yudkoff
Assistant Examiner—D. Sanders
Attorney, Agent, or Firm—Morse, Altman, Oates & Bello

[57] ABSTRACT

An automatically controlled distilling system is provided for use with a machine employed in the solvent scouring of textile materials. The system includes a plurality of interconnected stills each with its own condenser and water separator through which dirty solvent discharged from the scouring machine is distilled in order to return clean solvent back to the machine. Automatically actuated valves and pumps for directing and transferring solvent, sludge and steam through the system are controlled by timers responsive to certain pre-set conditions and adapted to cycle the stills in staggered sequence.

4 Claims, 2 Drawing Figures

AUTOMATIC DISTILLING SYSTEM

BACKGROUND OF THE INVENTION

1. Field of the Invention

This invention relates generally to distilling systems and more particularly is directed towards an automatic distilling system operatively connected to a machine used for the solvent scouring of textile materials.

2. Description of the Prior Art

In the production of various types of textile materials it is common practice to clean the material at least once during its production in order to remove various impurities. One impurity in particular is oil which quite often is intentionally added to the fibers in order to reduce friction. The oil, of course, must be removed after the web has been formed, as by weaving or knitting, in order that other processes may be carried out on the web such as dyeing, printing or the like. A common method for removing the oil and other impurities is to subject the web to a scouring process in which a dry cleaning solvent is employed by spraying the solvent against the web or bathing the web in a tank containing the solvent. By whatever means the solvent is applied to the web, the dirty solvent normally is recovered and distilled for re-use. Distillation systems of this type heretofore primarily have involved single stills and condensers and these generally have been manually operated.

It is an object of the present invention to provide a new and improved distilling system for use with solvent scouring machines. Another object of the invention is to provide an automated distilling system for solvent scouring machines having a high operating capacity and adapted to convert dirty solvent to clean solvent on a highly efficient basis.

SUMMARY OF THE INVENTION

This invention features an automatic distillation system for use with a machine employed in solvent scouring textiles, comprising a plurality of stills, a condenser operatively connected to each still, a water separator operatively connected to each condenser, separate tanks for temporarily storing dirty solvent and clean solvent, automatically and remotely operated pumps and valves provided in conduits interconnecting the stills, condensers, separators and tanks and a timing control unit operatively connected to the pumps and valves for operating the stills, valves and pumps in a predetermined sequence according to predetermined conditions.

DETAILED DESCRIPTION OF THE PREFERRED EMBODIMENTS 1

Figure 1:
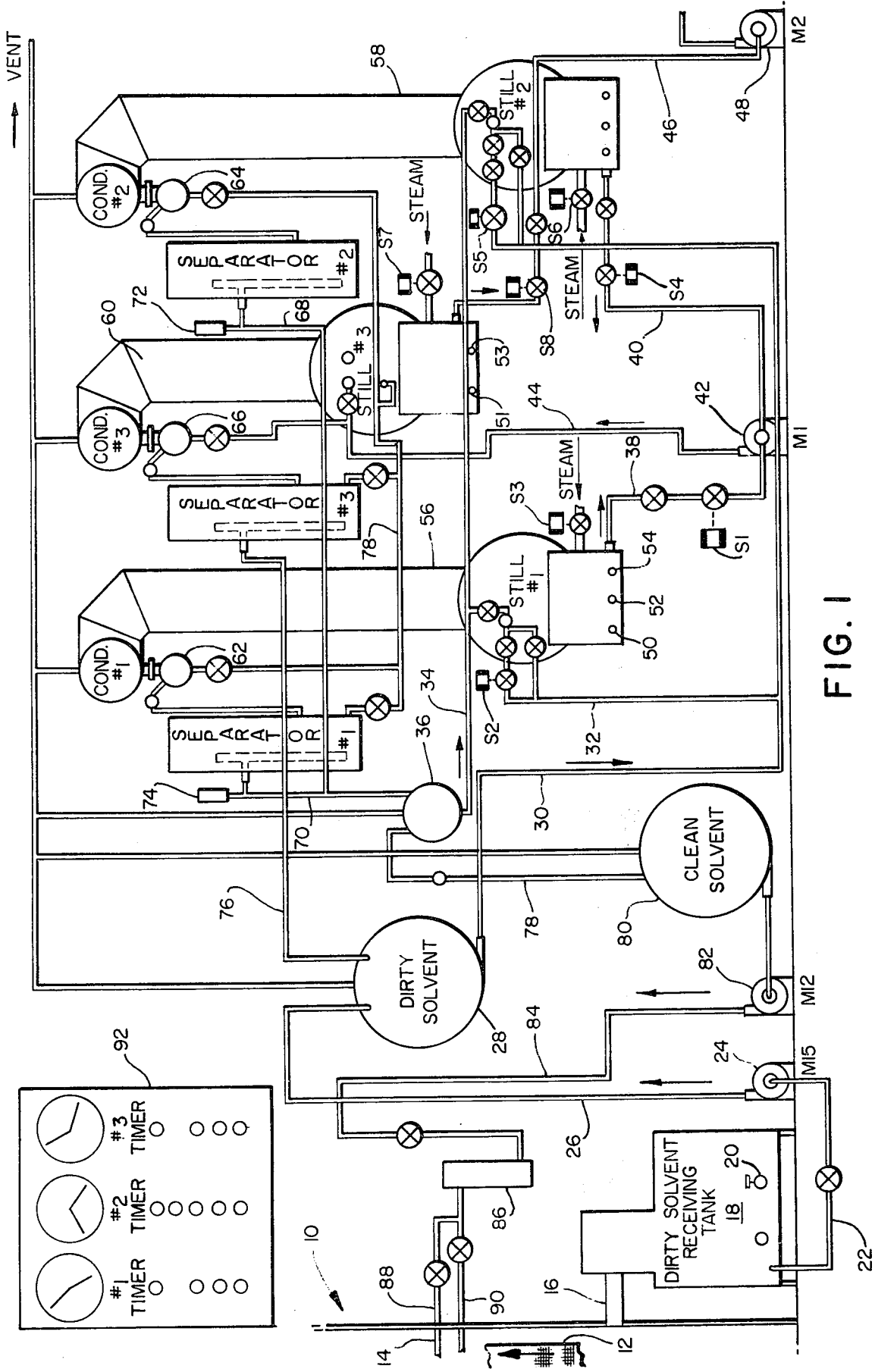
FIG. 1 is a schematic diagram of a distilling system made according to the invention, and, FIG. 2 is a schematic circuit diagram employed in the FIG. 1 system for operating the various components.

Referring now to the drawings and to FIG. 1 in particular, the reference character 10 generally indicates a solvent scouring machine of the sort shown in U.S. Pat. Nos. 3,701,269, 3,643,475 or 3,640,090 wherein a running web 12 is scoured as by jets 14 of a solvent sprayed over the face of the web. In addition to the jets of solvent, a tank of solvent may be employed in which the web is carried in and out to enhance the cleansing action. Various types of commercially available solvents may be employed. In any event, the web 12 typically might contain 5% oil and running at a rate of 35 yards per minute may result in the removal of perhaps 10 gallons of oil an hour. The oil removed from the web by the scouring action is mixed in with the solvent and this dirty solvent is removed from the scouring machine 10 through a conduit 16 to a dirty solvent receiving tank 18. The receiving tank 18 is provided with a pressure switch 20 and a conduit 22 connected to a transfer pump 24 which, in turn, is connected by means of a conduit 26 to a dirty solvent tank 28, typically having a capacity of 1,000 gallons. The transfer pump 24 is operatively connected to the pressure switch 20 which turns on the transfer pump 24 when the dirty solvent in the tank 18 reaches a pre-set maximum level and turns off the pump 24 when the level of the liquid in the tank 18 drops to a predetermined minimum level. The dirty solvent tank 28 is connected by conduits 30 and 32 to still No. 1 and still No. 2, both of these stills typically being of 800 gallons capacity per hour. Stills No. 1 and 2 are employed for regular distilling and both are connected by a conduit 34 to a relatively small clean solvent storage tank 36, typically of 150 gallons capacity. The tank 36 is adapted to deliver clean solvent to either still No. 1 or still No. 2 in case of contamination.

Still No. 3 is connected to the drain lines 38 and 40, respectively, of stills Nos. 1 and 2, the drain lines feeding to a common transfer pump 42 discharging through a conduit 44 to still No. 3. The No. 3 still is used primarily to carry out a boiling off process whereby accumulated oils are periodically stripped. The No. 3 still is supplied from either still No. 1 or 2 by means of the transfer pump 42, typically having a capacity of 50 gallons per minute. No. 3 still is connected by means of a conduit 46 to a sludge pump 48, typically a gear-type pump having a capacity of 28 gallons per minute, for removing sludge and oil to a waste receptacle.

Nos. 1 and 2 stills are provided with three pressure switches 50, 52 and 54 serving respectively as a high pressure switch, a low pressure switch and a medium pressure switch. No. 3 still is equipped with only a high pressure switch 51 and a low pressure switch 53. These pressure switches maintain the level of the liquid within each still. The function of the switches will be described more fully below during the description of the operation of the system. Also, each of the stills is equipped with steam heating coils appropriately valved for heating the solvent to distillation temperatures.

Each of the stills is connected by a trunk 56, 58 and 60 to an associated condenser 1, 2 and 3, respectively, wherein the solvent vapor from the stills is condensed back into liquid form. The condensate from each of the condensers first passes through an associated solvent cooler 62, 64 and 66, respectively, and thence through water separators 1, 2 and 3, respectively.

Nos. 1 and 2 water separators receive clean solvent from coolers 62 and 64, respectively, and discharge to the clean solvent storage tank 36 through conduits 68 and 70, respectively. Water separators Nos. 1 and 2 are provided with thermostats 72 and 74, respectively, and these are adapted to shut off steam to the related still if the condensate gets too hot. The thermostat is also adapted to stop delivery of the solvent feed to the stills in such event. The No. 3 water separator receives solvent from the No. 3 cooler and discharges its condensed solvent to the dirty solvent tank 28 through a conduit 76. The three water separators pass any separated water to a common drain pipe 78. Also, in each of the three stills there is provided a separate valved drain connecting to a common drain pipe. These drains from the three stills are used when the heating coils within the stills are periodically cleaned as by boiling them with water and caustic soda.

Drain connections are furnished on each of the three coolers and the three water separators and all feed through still No. 3 for use if any of them should be contaminated. In practice, the liquor level sensors in the stills typically are set to function at different levels of liquid. For example, the high pressure switch 50 is adapted to maintain a controlling level of solvent between 21 and 24 inches, approximately, the medium pressure switch 54 is adapted to maintain a liquor level of approximately 16 inches and the low switch 52 functions at about 1 inch of liquor level. These levels can, of course, be changed according to particular systems.

The clean solvent collected in the tank 36 overflows through a conduit 78 to a relatively large clean solvent tank 80, typically of a 1,000 gallons capacity. From the tank 80 clean solvent is returned to the scouring machine 10 by means of a clean solvent pump 82 delivering through a conduit 84, through a meter 86, typically set at 25 gallons per minute, and thence through spray bars 88 and 90 where it is sprayed onto the web 12 in jets 14.

The system is controlled by selective operation of the various pumps and by means of solenoid actuated valves, labeled S1 through S8, and the function will be described in connection with the operation of the system.

The operation of the pump and valves is under the control of a timing unit 92 provided with three timers, timer No. 1, timer No. 2 and timer No. 3 adapted to operate, respectively, stills Nos. 1, 2 and 3. The unit is also provided with indicator lights and switches to be described in connection with the operation of the system.

In operating a system having capacities suggested in the illustrated embodiment it is preferable that the quantity of solvent in the system at any one time be kept below 1,000 gallons. Obviously, this figure may be changed depending upon the size of the particular system. In the illustrated system, however, the rate of distillation is not controlled to the rate of clean solvent feed. For example, if the rate of clean solvent feed is less than the rate of distillation, the clean solvent 1,000 gallon storage tank 80 would gradually approach capacity while the dirty solvent tank 28 would become empty.

The illustrated distillation system employs three 20 hour timers 1, 2 and 3, one for each still. In the initial startup of the system, timer No. 2 is delayed until timer No. 1 is halfway through its cycle of operation of still No. 1. Thereafter, still No. 2 will always be half out of phase of still No. 1 unless the distillation time is changed.

By way of example, in setting up the time period for distillation, a typical installation for fabric containing 5% oil weighing 12 ounces per yard and running at 35 yards per minute would accumulate 10 gallons of oil per hour in stills No. 1 and No. 2. Therefore, an 18 hour distillation rate is selected with a 1 hour dwell time. This means that each of stills Nos. 1 and 2 will dump to still No. 3 every 18 hours of machine running time.

Figure 2:
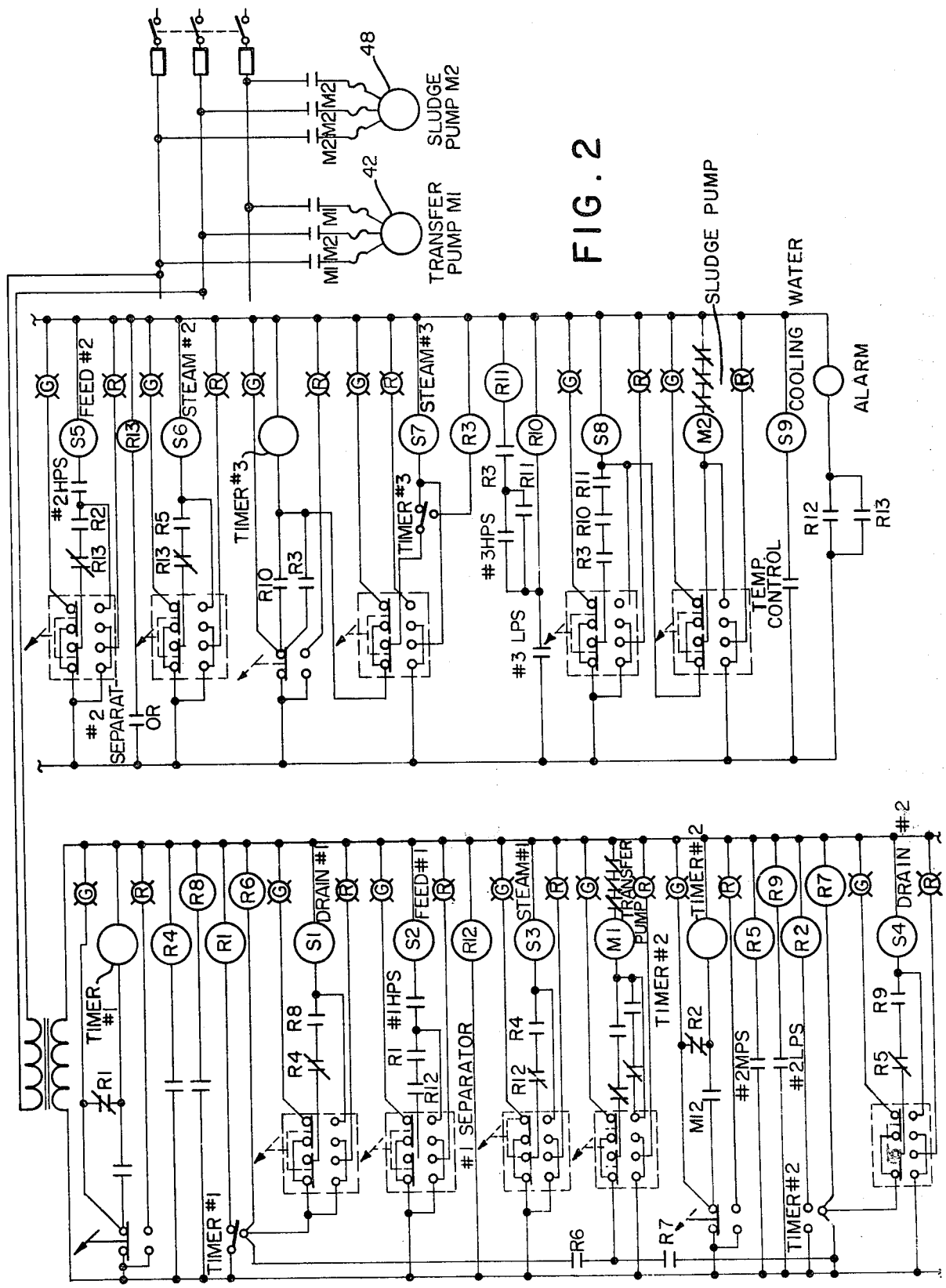

In describing the operation of the system, reference is limited to still No. 1 insofar as still No. 2 will perform a duplicate cycle except that it will be half out of phase on time with still No. 1. Both timers Nos. 1 and 2 are functional only when the clean solvent pump 82 is operating since that is the only time that oil accumulates. This is done through normally open contacts for a clean solvent feed pump starter. When the distilling cycle starts, relay R1 (FIG. 2) is energized and solvent flows either by gravity, as shown, or by pump, to No. 1 still from the dirty solvent tank 28 with valve S2 being open. As the liquor level builds up in the No. 1 still, it will gradually reach a height of perhaps 16 inches in a typical embodiment, which level will just cover the heating coils in the still. Under these conditions, the medium pressure switch 64 will close to energize relay R4 which, in turn, will open steam valve S3. Solvent will keep on flowing into No. 1 still until it reaches a height of approximately 24 inches which will re-act on the high pressure switch 50 causing it to close feed valve S2. This valve will continue to open and close between liquor levels of 21 to 24 inches for the duration of the distillation period.

At this time relay R1 will be energized and this, in turn, will de-energize the relay for valve S2 causing it to close and stop the flow of solvent to still No. 1. Relay R6 is then energized to close the circuit on the transfer pump 42. However, the transfer pump 42 cannot be energized insofar as the contacts for relay R4 are still open. In the same manner the drain valve S1 remains closed insofar as its relay contacts are still open and solvent will continue to be distilled although the solvent feed has stopped. Distillation will continue until it reaches a level of approximately 16 inches in still No. 1. At this point, relay R4 is de-energized, closing the contacts which will open the drain valve S1 and start the transfer pump 42. The discharge of still No. 1 is thereupon transferred to still No. 3 through the conduit 44. The liquor level in still No. 1 will drop until it causes the low pressure switch 52 to open, thereby de-energizing relay R8. This will stop the transfer pump 42 and close the drain valve S1. The system will remain in this state until the dwell time expires on timer No. 1. The timer No. 1 will then switch to the distillation time period and repeat the process.

Reference is now made to still No. 3 which performs the boiling off operation. When the drains are pumped from the No. 1 still, the liquor level will start to rise in still No. 3. In still No. 3 its low pressure switch will first close energizing relay R10 to start timer No. 3 which typically is set for 2 hours of boil off time. It will also close contacts to relay R10 for drain valve S8 from No. 3 still, but the relay R3 contacts for the drain valve S8 are still open and valve S7 closes furnishing steam to the coils for still No. 3.

At the expiration of the boiling off time for still No. 3 (typically 2 hours) the contacts on timer No. 3 will switch to a dwell time of approximately 30 minutes to 1 hour setting. This will close steam valve S7 and energize relay R3. The closed contacts of relay R3 will keep the motor running on timer No. 3 and cause the solenoid actuated drain valve S8 for still No. 3 to open and at the same time starting the sludge pump 48 which pumps the sludge from still No. 3 to a waste receptacle. When the sludge in still No. 3 reaches a level of approximately 1 inch its low pressure switch will open causing the drain valve S8 for still No. 3 to close and stop the sludge pump 48. At the expiration of the dwell time period the contacts for timer No. 3 will switch to de-energize the relay R3 and stop the motor for timer No. 3. Still No. 3 will then be ready for the next boil off operation which normally would then be from still No. 2.

In practice, the still No. 3 will accumulate sludge through several cycles of distillation before the sludge pump is operated since the rate of accumulation of sludge in still No. 3 is relatively slow. Sludge is pumped out of No. 3 still only during a dwell period and not during the boiling off period.

By cycling stills Nos. 1 and 2 in staggered half out of phase sequence both drains may be dumped sequentially to still No. 3 without exceeding the capacity of still No. 3.

Having thus described the invention, what I claim and desire to obtain by Letters Patent of the United States is:

1. An automatic system for recovering, distilling and returning solvents and the like from and to a textile scouring apparatus, comprising
   a. a dirty solvent storing tank adapted to receive dirty solvent from said apparatus,
   b. first, second and third stills,
   c. first conduit means connecting said tank to each of said first and second stills,
   d. second conduit means connecting said first and second stills to said third still,
   e. a condenser operatively connected to each of said stills,
   f. remotely controlled pump means in said second conduit means for selectively transferring residue liquid from said first and second stills to said third still,
   g. remotely controlled valve means connected to said first and second conduit means,
   h. timing means operatively connected to said valve means and said pump for operating said stills in predetermined timed sequence and alternately transferring residue liquid from said first and second stills to said third still,
   i. said timing means including a clock operatively connected to each of said stills, each of said clocks adapted to operate its associate still for a predetermined period of time, the operating time period of the clock associated with the first still being substantially out of phase with the operating time period of the clock associated with the second still,
   j. liquid level sensing means mounted in each of said stills, said sensing means being operatively connected to said pump means to said valve means,
   k. a clean solvent storage tank connected to said condensers to receive clean condensed solvent therefrom and second pump means connected to said clean solvent storage tank and to said apparatus for returning clean solvent to said apparatus, and,
   L. a sludge pump connected to said third still for removing sludge therefrom.

2. An automatic system according to claim 1 including remotely operated heating means connected to each of said stills and to said timing means.

3. An automatic system according to claim 2 wherein said heating means includes third conduit means connected to a steam source and remotely controlled valve means connected to said third conduit means and to said timing means.

4. An automatic system according to claim 1 including water separating means operatively connected to each of said condensers.

* * * * *